US010152698B2

(12) United States Patent
Li et al.

(10) Patent No.: US 10,152,698 B2
(45) Date of Patent: Dec. 11, 2018

(54) SYSTEM AND METHOD FOR MOBILE PAYMENTS IN A VEHICLE

(71) Applicant: Samsung Electronics Co., Ltd., Gyeonggi-do (KR)

(72) Inventors: Zhiyun Li, Kenmore, WA (US); Pei Zheng, Sammamish, WA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/925,818

(22) Filed: Oct. 28, 2015

(65) Prior Publication Data

US 2016/0063459 A1 Mar. 3, 2016

Related U.S. Application Data

(63) Continuation-in-part of application No. 14/831,490, filed on Aug. 20, 2015, and a continuation-in-part of application No. 14/468,790, filed on Aug. 26, 2014.

(51) Int. Cl.
*G06Q 20/10* (2012.01)
*G06Q 20/32* (2012.01)
*G06Q 20/14* (2012.01)
*H04W 4/80* (2018.01)
*H04W 4/00* (2018.01)
*H04W 4/04* (2009.01)

(52) U.S. Cl.
CPC ............ *G06Q 20/10* (2013.01); *G06Q 20/14* (2013.01); *G06Q 20/145* (2013.01); *G06Q 20/3224* (2013.01); *H04W 4/008* (2013.01); *H04W 4/046* (2013.01); *H04W 4/80* (2018.02)

(58) Field of Classification Search
None
See application file for complete search history.

(56) References Cited

U.S. PATENT DOCUMENTS 8,315,617 B2 * 11/2012 Tadayon ................. H04M 3/53
455/418
9,167,418 B1 * 10/2015 Tuluca .................. H04W 4/046
(Continued)

FOREIGN PATENT DOCUMENTS

WO 2014144760 A1 9/2014

OTHER PUBLICATIONS

European Patent Office, "European Search Report," Application No. 16180852.2-1958, Oct. 14, 2016, 7 pages, publisher EPO, Munich, Germany.
(Continued)

*Primary Examiner* — Truc M Do

(57) ABSTRACT

A payment server configured to share payments among occupants of a vehicle. The payment server receives a payment request comprising a payment amount and a vehicle identification, accesses a database record associated with the vehicle identification, the record including an identification and seat position of each vehicle occupant as determined from a mobile device of each occupant, and identifies the vehicle driver. The server transmits to an in-vehicle infotainment (IVI) system a first billing message associated with the payment request, the IVI system displaying the first billing message on a screen of an IVI head unit. The first billing message offers the driver an option to share the payment amount with a second occupant of the vehicle.

20 Claims, 9 Drawing Sheets

(56) References Cited

U.S. PATENT DOCUMENTS

| | | | | |
|---|---|---|---|---|
| 9,332,126 | B2* | 5/2016 | Tadayon | H04W 48/02 |
| 9,358,940 | B2* | 6/2016 | Cooper | B60R 16/037 |
| 9,467,817 | B1* | 10/2016 | Van Wiemeersch | ......... |
| | | | | H04W 4/046 |
| 9,510,159 | B1* | 11/2016 | Cuddihy | H04W 4/046 |
| 9,538,332 | B1* | 1/2017 | Mendelson | H04W 4/023 |
| 9,681,361 | B2* | 6/2017 | Tuluca | H04W 48/04 |
| 9,682,683 | B2* | 6/2017 | Williams | B60R 25/01 |
| 9,692,902 | B2* | 6/2017 | Tadayon | H04M 3/53 |
| 2006/0059023 | A1* | 3/2006 | Mashinsky | G06Q 10/02 |
| | | | | 705/5 |
| 2006/0085308 | A1* | 4/2006 | Metzger | G06Q 10/087 |
| | | | | 705/34 |
| 2008/0195428 | A1* | 8/2008 | O'Sullivan | G06Q 10/00 |
| | | | | 705/6 |
| 2009/0100476 | A1* | 4/2009 | Frisco | H04B 7/18508 |
| | | | | 725/68 |
| 2009/0160229 | A1* | 6/2009 | Mabuchi | B60N 2/01 |
| | | | | 297/217.3 |
| 2010/0153279 | A1* | 6/2010 | Zahn | G06Q 10/02 |
| | | | | 705/80 |
| 2011/0148574 | A1* | 6/2011 | Simon | B60R 25/24 |
| | | | | 340/5.61 |
| 2011/0231310 | A1* | 9/2011 | Roberts | G06F 21/316 |
| | | | | 705/40 |
| 2012/0006610 | A1* | 1/2012 | Wallace | H04M 1/67 |
| | | | | 180/272 |
| 2012/0040665 | A1* | 2/2012 | Liu | H04W 4/80 |
| | | | | 455/426.1 |
| 2012/0041675 | A1* | 2/2012 | Juliver | G06Q 10/08 |
| | | | | 701/465 |
| 2012/0259665 | A1* | 10/2012 | Pandhi | B60L 11/1809 |
| | | | | 705/4 |
| 2013/0030645 | A1* | 1/2013 | Divine | B60K 35/00 |
| | | | | 701/36 |
| 2013/0290040 | A1* | 10/2013 | Perry | G06Q 10/02 |
| | | | | 705/5 |
| 2014/0180773 | A1* | 6/2014 | Zafiroglu | G06Q 30/0207 |
| | | | | 705/13 |
| 2014/0309806 | A1* | 10/2014 | Ricci | B60Q 1/00 |
| | | | | 701/1 |
| 2015/0127526 | A1* | 5/2015 | Ye | G06Q 20/10 |
| | | | | 705/39 |
| 2015/0206206 | A1* | 7/2015 | Puente | G06Q 30/0645 |
| | | | | 705/307 |
| 2015/0358052 | A1* | 12/2015 | Muirhead | H04B 5/0068 |
| | | | | 455/41.1 |
| 2016/0171637 | A1* | 6/2016 | Rai | H04L 67/12 |
| | | | | 705/13 |

OTHER PUBLICATIONS

Communication from a foreign patent office in a foreign counterpart application, European Patent Office, "Communication pursuant to Article 94(3) EPC," European Application No. 16180852.2, dated Jan. 23, 2018, 5 pages.

* cited by examiner

| Seat | BLEB1 | BLEB2 | BLEB3 | BLEB4 | BLEB5 | BLEB6 | BLEB7 | BLEB8 |
|------|-------|-------|-------|-------|-------|-------|-------|-------|
| FL | -50 dB | -48 dB | -71 dB | -90 dB | -55 dB | -72 dB | -70 dB | -68 dB |

| Seat | BLEB1 | BLEB2 | BLEB3 | BLEB4 | BLEB5 | BLEB6 | BLEB7 | BLEB8 |
|------|-------|-------|-------|-------|-------|-------|-------|-------|
| FL | -50 dB | -48 dB | -71 dB | -90 dB | -55 dB | -72 dB | -70 dB | -68 dB |
| FL | | | | | | | | |
| FL | | | | | | | | |
| FL | | | | | | | | |
| FR | | | | | | | | |
| FR | | | | | | | | |
| FR | | | | | | | | |
| FR | | | | | | | | |
| RL | | | | | | | | |
| RL | | | | | | | | |
| RL | | | | | | | | |
| RL | | | | | | | | |
| RR | | | | | | | | |
| RR | | | | | | | | |
| RR | | | | | | | | |
| RR | | | | | | | | |

SYSTEM AND METHOD FOR MOBILE PAYMENTS IN A VEHICLE

CROSS-REFERENCE TO RELATED APPLICATION(S) AND CLAIM OF PRIORITY

The present application is a continuation-in-part of U.S. patent application Ser. No. 14/831,490, entitled "APPARATUS AND METHOD FOR IDENTIFYING AND LOCALIZING VEHICLE OCCUPANT AND ON-DEMAND PERSONALIZATION" and filed on Aug. 20, 2015. The present application is also a continuation-in-part of U.S. patent application Ser. No. 14/468,790, entitled "PORTABLE AND PERSONALIZED PASSENGER INFOTAINMENT SYSTEM IN CONNECTED CAR" and filed on Aug. 26, 2014. U.S. application Ser. Nos. 14/831,490 and 14/468,790 are assigned to the assignee of the present application and are hereby incorporated by reference into the present application as if fully set forth herein. The present application hereby claims priority under 35 U.S.C. § 120 to U.S. patent application Ser. Nos. 14/831,490 and 14/468,790.

TECHNICAL FIELD

The present application relates generally to in-vehicle infotainment (IVI) systems and, more specifically, to an IVI system and a smart phone that enable vehicle occupants to share payments.

BACKGROUND

In-vehicle infotainment (IVI) systems are becoming ubiquitous. A driver can listen to music, news, and other audio content from the IVI head unit. In addition, a driver can personalize the IVI head unit for favorite content, navigation history, or vehicle telematics, and the like. Some IVI systems include additional entertainment system for each passenger, such as on the seat back, the roof, or the like. A passenger can even watch video and play games on those systems. At the same time, vehicle controls are also highly customizable to individual driver or passengers, enabling a vehicle to store a seat position, a steering wheel position, mirror positions, radio stations, temperature settings, and the like for one or more users of the vehicle. These advancements have given rise to the development of "connected car" systems that communicate with "cloud" services and provide a high degree of vehicle customization for each occupant.

Mobile payment systems are also becoming ubiquitous. Mobile payment systems are usually designed for smartphones and other wearable devices, such as a smart watch. In some special cases (e.g., highway toll collections, drive-through stores, and the like), the mobile payment system is designed for a car while the driver stays in the car. While this works well in many cases, there is a major limitation for vehicle applications, namely payment sharing. All current mobile payment systems are designed for a single person (the payer) to pay per transaction. But in many instances, it is desirable to share the payment among several people. This is frequently the case for a group of people in the same car.

For example, a group of friends may want to share payments when driving to a national park, passing through a toll bridge, or picking up lunch at a drive-through restaurant. In some cases, the vehicle occupants may be responsible for an equal share of a payment (e.g., parking fees, bridge tolls, admission fees). In other cases, each occupant may be responsible for paying for the items he or she purchased, such as paying for lunches from a drive-through restaurant.

Current mobile payment systems are not capable of sharing payments because these systems are designed for a single payer and/or single vehicle, not for a group of payers. The current systems have no ability to determine the identities of vehicle occupants autonomously, so there is no way to deliver the payment request to each occupant easily.

Therefore, there is a need in the art for improved methods and apparatuses for accepting multiple payments from multiple vehicle occupants. More particularly, there is a need for methods and apparatuses for sharing the cost of a purchase between multiple occupants of a vehicle.

SUMMARY

To address the above-discussed deficiencies of the prior art, it is a primary object to provide a payment server configured to share payments among occupants of a vehicle. The payment server is configured to: 1) receive from a payment station a payment request comprising a payment amount and a vehicle identification; 2) access in a database associated with the payment server a record associated with the vehicle identification, wherein the record includes an identification and seat position of each occupant of the vehicle, wherein the identification and the seat position of each occupant are determined from a mobile device associated with each occupant; 3) identify from the record a driver of the vehicle; and 4) transmit to an in-vehicle infotainment (IVI) system in the vehicle a first billing message associated with the payment request, the IVI system displaying the first billing message on a screen of an IVI head unit in the vehicle.

In an advantageous embodiment, the first billing message offers the driver of the vehicle an option to share the payment amount with a second occupant of the vehicle. If the driver decides to share the payment amount with a second occupant of the vehicle, the payment server is further configured to transmit a second billing message to a mobile device associated with the second occupant. The second billing message allows the second occupant of the vehicle to agree to pay a portion of the payment amount. The second billing message allows the second occupant of the vehicle to select a purchased item for which the second occupant is responsible.

It is another primary object to provide a method of sharing payments among occupants of a vehicle. The method comprises: 1) in a payment server, receiving from a payment station a payment request comprising a payment amount and a vehicle identification; 2) accessing in a database associated with the payment server a record associated with the vehicle identification, wherein the record includes an identification and seat position of each occupant of the vehicle, wherein the identification and the seat position of each occupant are determined from a mobile device associated with each occupant; 3) identifying from the record a driver of the vehicle; and 4) transmitting to an in-vehicle infotainment (IVI) system in the vehicle a first billing message associated with the payment request, the IVI system displaying the first billing message on a screen of an IVI head unit in the vehicle.

It is another primary object to provide a non-transitory computer readable medium configured to control a processor to perform a method of sharing payments among occupants of a vehicle. The method comprises: 1) in a payment server, receiving from a payment station a payment request comprising a payment amount and a vehicle identification; 2) accessing in a database associated with the payment server a record associated with the vehicle identification, wherein the record includes an identification and seat position of each occupant of the vehicle, wherein the identification and the seat position of each occupant are determined from a mobile device associated with each occupant; 3) identifying from the record a driver of the vehicle; and 4) transmitting to an in-vehicle infotainment (IVI) system in the vehicle a first billing message associated with the payment request, the IVI system displaying the first billing message on a screen of an IVI head unit in the vehicle.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates an exemplary set of collected data for eight Bluetooth Low Energy (BLE) beacons measured for one seat position according to one embodiment of the disclosure.

FIG. 6 illustrates an exemplary data table for multiple sets of collected data for multiple seat positions according to one embodiment of the disclosure.

DETAILED DESCRIPTION

Figure 1:
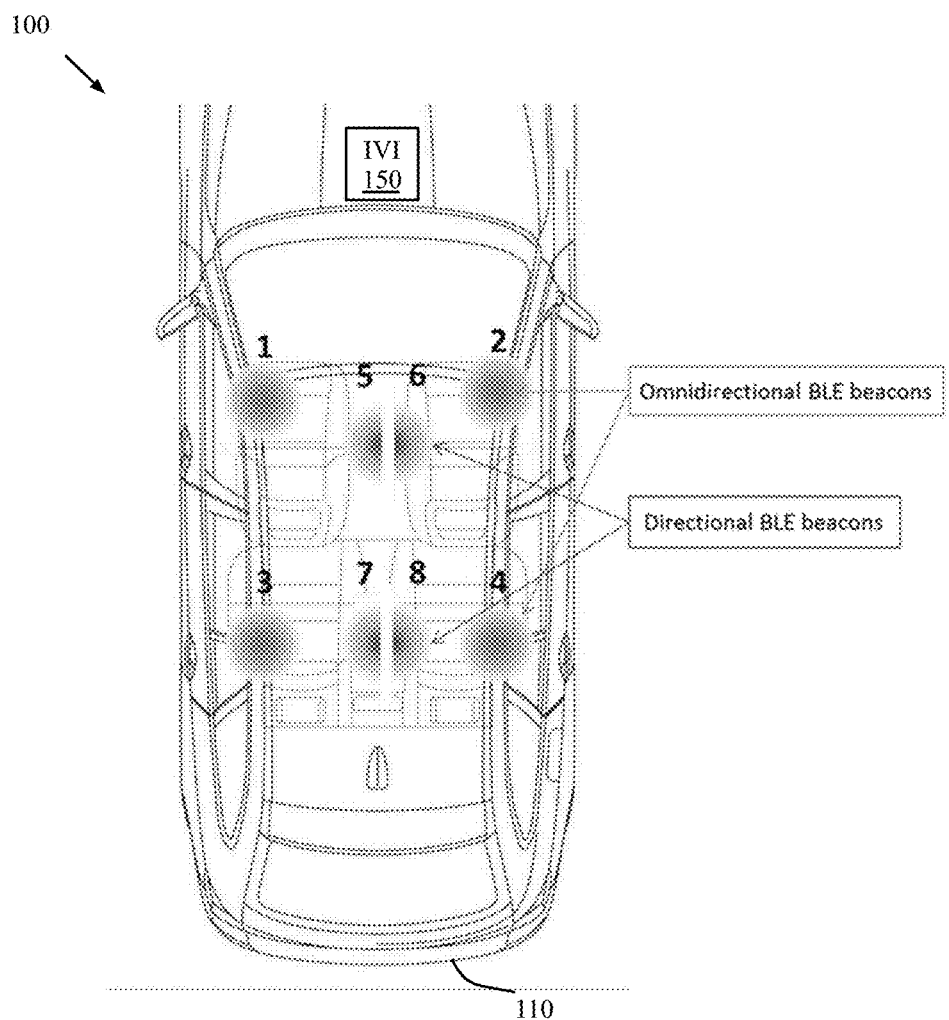
FIG. 1 illustrates an exemplary configuration of an in-vehicle infotainment (IVI) system and Bluetooth Low Energy (BLE) beacons according to one embodiment of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged connected car system and mobile phone.

Those present disclosure incorporated U.S. patent application Ser. Nos. 14/831,490 and 14/468,790 by reference above. U.S. patent application Ser. Nos. 14/831,490 and 14/468,790 provide the necessary hardware and software framework to: i) automatically identify the occupants of a vehicle by identifying and communicating with the smartphones of the occupants and the in-vehicle infotainment (IVI) system; and ii) automatically detect the seat position of each identified occupant by locating the position of the smartphone of each occupant. As a result, a cloud platform payment processing system (or mobile payment server) that communicates with the IVI system automatically knows who the vehicle occupants are and where each occupant is sitting. As a result, the cloud-based mobile payment server knows which vehicle occupant is the driver.

The mobile payment server can therefore access the account information of all of the vehicle occupants. As a result, the mobile payment server can receive and process a payment request initiated by a payment station, such as a tollbooth. The payment station sends the payment request to the cloud-based mobile payment server along with the vehicle identification (ID) (e.g., toll tag ID, license plate number, etc.). Since the mobile payment server already knows the identities of the vehicle occupants, the mobile payment server may distribute the payment request to each occupant in that car. (Alternatively, the payment request may be generated from the IVI system head unit or calculated by mileage, etc.). In an advantageous embodiment, the disclosed system may use Bluetooth Low Energy (BLE) beacon signals to further secure the payment request by cross-validating with license plate tag scanned by the tollbooth reader/camera.

The present disclosure and U.S. patent application Ser. No. 14/831,490 provide a framework for automatically detecting the in-vehicle seat location for each occupant and personalizing vehicle controls accordingly. The framework includes the following features: i) a specially arranged Bluetooth Low Energy (BLE) beacon array inside the vehicle; ii) a set of calibrations easily performed by a user (typically the owner or the vehicle manufacturer) on his mobile device; iii) a set of methods to extend the calibration data to a wide range of real-world scenarios; iv) a set of smart machine learning algorithms to optimally determine the in-car vehicle location for each occupant, in a wide range of real-world scenarios; and v) a cloud-based server to facilitate the in-vehicle seat location for each occupant and enable further personalization.

FIG. 1 illustrates exemplary configuration 100 of in-vehicle infotainment (IVI) system 150 and a plurality of Bluetooth Low Energy (BLE) beacons (BLEB1-BLEB8) in vehicle 110 according to one embodiment of the disclosure. IVI system 150 provides a vehicle with numerous advanced services, including high speed wireless access (e.g., 4G/LTE), advanced diagnostics, telematics, remote services, front passenger seat and/or rear seat "infotainment" (e.g., audio, video, Internet), voice recognition, automotive apps, and the like.

Bluetooth Low Energy (BLE) beacons BLEB1-BLEB8 are installed inside the vehicle 110. BLEB1, BLEB2, BLEB3, and BLEB4 are omnidirectional beacons that radiate signals evenly in a 360 degree arc. In the exemplary configuration, BLEB1 is located in the front left corner of the passenger compartment, BLEB2 is located in the front right corner of the passenger compartment, BLEB3 is located in the rear left corner of the passenger compartment, and BLEB4 is located in the rear right corner of the passenger compartment.

BLEB5, BLEB 6, BLEB7, and BLEB8 are directional beacons that radiate signals primarily in one direction. In the exemplary configuration, BLEB5 is located in the front seat between the driver seat and front passenger set and radiates its signal primarily towards the driver seat. BLEB6 is also located in the front seat between the driver seat and front passenger seat, but BLEB6 radiates its signal primarily towards the front passenger seat. BLEB7 is located in the rear seat between the two rear passenger seats and radiates its signal primarily towards the rear left passenger seat. BLEB8 is also located between the two rear passenger seats, but BLEB8 radiates its signal primarily towards the rear right passenger seat.

According to the principles of the present disclosure, the mobile phone of a person sitting in vehicle 110 is configured to measure signals from all eight of the Bluetooth Low Energy (BLE) beacons (BLEB1-BLEB8), then apply a seat location prediction model M, described below, to detect the seat location of the user, then report the user seat location to a cloud server.

Figure 2:
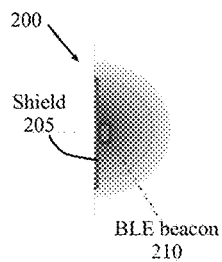
FIG. 2 illustrates an exemplary Bluetooth Low Energy (BLE) beacon according to one embodiment of the disclosure.

FIG. 2 illustrates exemplary directional Bluetooth Low Energy (BLE) beacon 200 according to one embodiment of the disclosure. Directional BLE beacon 200 comprises electromagnetic (EM) shield 205 and omnidirectional BLE beacon 210. EM shield 205 may comprise, for example, aluminum foil that acts as an electromagnetic shield to block one side of omnidirectional BLE beacon 210, as long as the radius of the foil is larger than the wavelength of the BLE signal (~12.5 cm). Alternatively, directional beacon can be manufactured in other form factors using other EM technologies, such as QUALCOMM Gimbal directional beacons.

BLE beacons 1-8 are low power consumption broadcasting devices with battery lives of two (2) years or longer. Each BLE beacon is a standalone device that periodically broadcasts data signals that includes the beacon identifier (ID) value as well as other optional data, such as a vehicle identifier (ID) value. Exemplary omnidirectional beacons may include Estimote beacons. Exemplary directional beacons may include QUALCOMM Gimbal directional beacons or modified omnidirectional beacons as described in FIG. 2.

Figure 3:
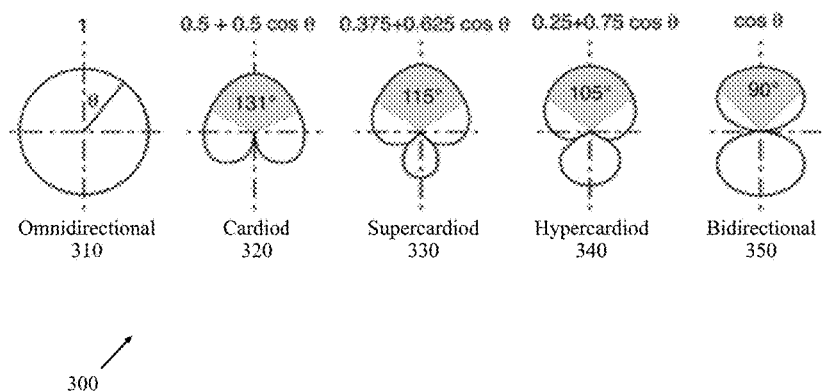
FIG. 3 illustrates exemplary omnidirectional and directional patterns of Bluetooth Low Energy (BLE) beacons according to one embodiment of the disclosure.

FIG. 3 illustrates exemplary omnidirectional and directional patterns of Bluetooth Low Energy (BLE) beacons according to one embodiment of the disclosure. The exemplary signal patterns include omnidirectional 310, cardioid 320, supercardioid 330, hypercardioid 340, and bi-directional 350.

The actual layout of BLE beacons in vehicle 110 is flexible. In FIG. 1, the directional beacons are placed along the centerline of the vehicle and facing the seat. This is expected to create enough difference between left and right seats most of the time. At least one omnidirectional beacon is placed at a position reasonably away from the seats, such as the furthest corner. This is expected to act as an additional reference to further enhance the reliability. At each seat, the received signal strengths are expected to be different than at other seats.

The signal from each beacon may be observed at any location inside the vehicle, often with unpredictable noise, interference and fluctuations. Thus, at any in-vehicle location, a mobile device may receive all 8 BLE beacon signals. However, it is possible that, due to noise and interference, the signal from BLEB2, for example, received at the rear left seat may sometimes be stronger than that from BLEB3, although most of time it is expected to be weaker. Therefore, there is no simple threshold to reliably determine the in-car location of the mobile device from the received signal strength indicators (RSSIs). However, a machine learning process according to the principles of the disclosure filters out noise. The present disclosure describes methods and apparatuses that use all the beacon signals collectively and intelligently to determine reliably the in-vehicle location of a user and his or her mobile device.

Figure 4:
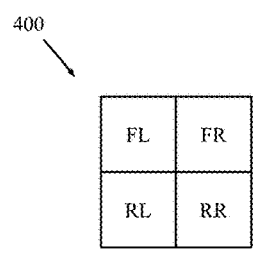
FIG. 4 illustrates an exemplary user interface showing a seating configuration of a vehicle according to one embodiment of the disclosure.

FIG. 4 illustrates exemplary user interface (UI) 400 of a calibration application showing a seating configuration of a vehicle according to one embodiment of the disclosure. To begin the process of developing a seat prediction model M of vehicle 110, a mobile phone user, typically the owner of the vehicle or the manufacturer, launches an application on the mobile phone that displays UI 400. The user then selects one of front left (FL), front right (FR), rear left (RL), or rear right (RR), depending on the seat in which the user is located. Once a seat has been selected, the mobile phone begins to continuously record the received signal strength indicator (RSSI) for each BLE beacon. During the recording, the user may move the mobile phone around in the same manner as he usually would do when seated. The recording can continue for a short period of time, such as half minute. Then the user can stop the recording process for that seat using the UI 400. The user repeats this recording process for each seat.

The disclosed mobile device and related methods do not require any prior knowledge about the location or broadcasting power of each BLE beacon. Instead, the disclosed technique collects BLE beacon calibration data using the personal mobile device of the user (e.g., smartwatch, smartphone, pad device, laptop, and the like). For example, if a user mobile device records the beacon signals from each of the four seat locations (front-left, front-right, rear-left, rear-right) in vehicle 110, one entry of the data collected by the application on the mobile device may look like the data in FIG. 5. FIG. 5 illustrates exemplary data set 500 of collected data for eight Bluetooth Low Energy (BLE) beacons measured at one moment for one seat position, namely, front left (FL) according to one embodiment of the disclosure. Data set 500 is essentially a sample of electronic signature for the 8 BLE beacons as seen in the front left seat at a certain moment. This signature will be continuously sampled at a fixed interval during the recording process, such as once per second for 30 seconds. Once the signature is sufficiently sampled, a data generalization and machine learning process will be used to filter out noises and find the signature for that seat. The electronic signatures in the each of the four seats will be different. Together, the electronic signatures for all four seats comprise a seat prediction model M.

Thus, the data collection process performed by the user and the mobile device of the user may be summarized as follows: i) the user holds the mobile device and occupies one seat in vehicle 110; ii) the user clicks one of the buttons (FL, FR, RL, and RR) on the mobile device UI 400, as shown in FIG. 4. The button corresponds to the seat occupied by the user; iii) the data collection application records all beacon signal strength values (i.e., RSSI values) periodically (e.g., once per second); iv) each recorded data entry consists of a signal strength value from each BLE beacon (e.g., eight values as in FIG. 5). The data entry is also labeled with the current seat location (e.g., FL); v) during the data recording, the user moves the mobile device around or puts the mobile device in a pocket, as the user normally would do when seated.

Each recording may last about 30 seconds. Then the user stops the current recording on the mobile device and repeats the process for all of the other seats in vehicle 110. Preferably, multiple rounds of data collection may be repeated to increase the data size. The disclosed technique may also record data when the user is just outside of vehicle 110.

FIG. 6 illustrates exemplary data table 600 for multiple sets of collected data for multiple seat positions according to one embodiment of the disclosure. The first entry is the same as data set 500 from FIG. 5 for the FL seat. The process is repeated at a fixed interval (e.g., once per second) for the front left seat, so that a list of data entries are collected and filled into data table 600 for the FL seat, one row per second. So, if the recording time is 30 seconds and the interval is one second, the FL seat will record 30 rows in total. The process is then repeated for the remaining seats (FR, RL, RR) until data table 600 is complete.

Preferably, the data collection process collects enough data to cover all possible scenarios of interference and noise caused by the user or other elements. Some typical scenarios may include: i) another user may carry a different mobile device, such as a different model of smartphone, or put the smartphone in a cover case or handbag, which may cause a different sensitivity of its BLE antenna; ii) there may be multiple occupants in the car. The human body absorbs and attenuates BLE signals or alters the travel paths of the BLE signals; iii) longer durations for data collection. The data collected is a time series of discrete samples. The longer the data collection period, the more variation of the data that will be captured in the time series; iv) the BLE beacon may degrade after a period of usage, such as reduced performance or power; and v) the BLE beacon may be displaced a little bit from its original installation position, such as by vehicle vibration.

In practice, however, it is very unlikely or even impossible for a typical vehicle owner or manufacturer to collect data for all those scenarios. Therefore, there is a need to automatically generate simulated data to maximally cover those scenarios, based on the data recorded in a relatively short period of time using a single mobile device. The disclosed system and method generalizes the data collected to include the following scenarios: i) various BLE antenna sensitivities. The disclosed system generates new data entries by scaling the raw data entry by a factor. Thus, the disclosed technique may simulate either a less or a more sensitive BLE antenna on the mobile device; ii) multiple occupants. For each seat, the disclosed system may attenuate the RSSI from the beacons associated with other seats, thus simulating the absorption by the human body of the BLE signal when other seats are occupied; iii) longer recording time. In addition to the raw data collection, the disclosed system may increase the data size and coverage by randomly shuffling the time series of raw data for each seat and then appending to the data set for that seat. Thus, the disclosed system may simulate a longer data collection time; and iv) various BLE beacon noises. The disclosed system may simulate BLE beacon noises by adding a random value to the raw recorded data entry to generate a new data entry To achieve the best robustness, the disclosed system may apply a sliding window to data table 600 for each seat. By way of example, a sliding window of size 3 may concatenate the first three rows from table 600 (FL1, FL2, FL3) for the FL seat into a single entry in a new table 600. The sliding window then concatenates the next three data sets (FL2, FL3, FL4) for the FL seat into the next single entry in the new table 600. The sliding window continues for all remaining FL seat data sets before repeating the process for the other seats, thus generates a generalized data table 600.

The generalized data table 600 is a labeled training data set ready for machine learning. In an exemplary embodiment of the disclosure, a seat prediction model M learned from the training data set will be used to predict a user seat location based on a time series of BLE signal samples, i.e. the sliding window. Automatic classifiers process generalized data table 600 using existing machine learning algorithms. A classifier may be trained using the training data, for example, the generalized data table 600 with BLE measurements and labels (FL, FR, RL, RR), until it learns how to label new measurements automatically and accurately. The two most widely used "off-the-shelf" classifiers are Support Vector Machine (SVM) and Random Forest (RF). Both well-known classifiers have similar performance with little manual adjustment. Additional information may be found at:

Support Vector Machine—
http://en.wikipedia.org/wiki/Support_vector_machine
Random Forest—http://en.wikipedia.org/wiki/Random_forest After the classifier (SVM, RF, or other) processes or learns the generalized data table 600, the classifier generates a seat prediction model M with accuracy of prediction. The seat prediction model M is later applied to new data, e.g. a new window of 3 consecutive BLE measurements, then output a new seat position P. The accuracy will usually reach 98% to 100% using the above-described data generalization techniques. The longer the sliding window that is used, the greater the accuracy that may be achieved, but with increased latency. An acceptable trade-off may be chosen, depending on the requirements of an application.

Figure 7:
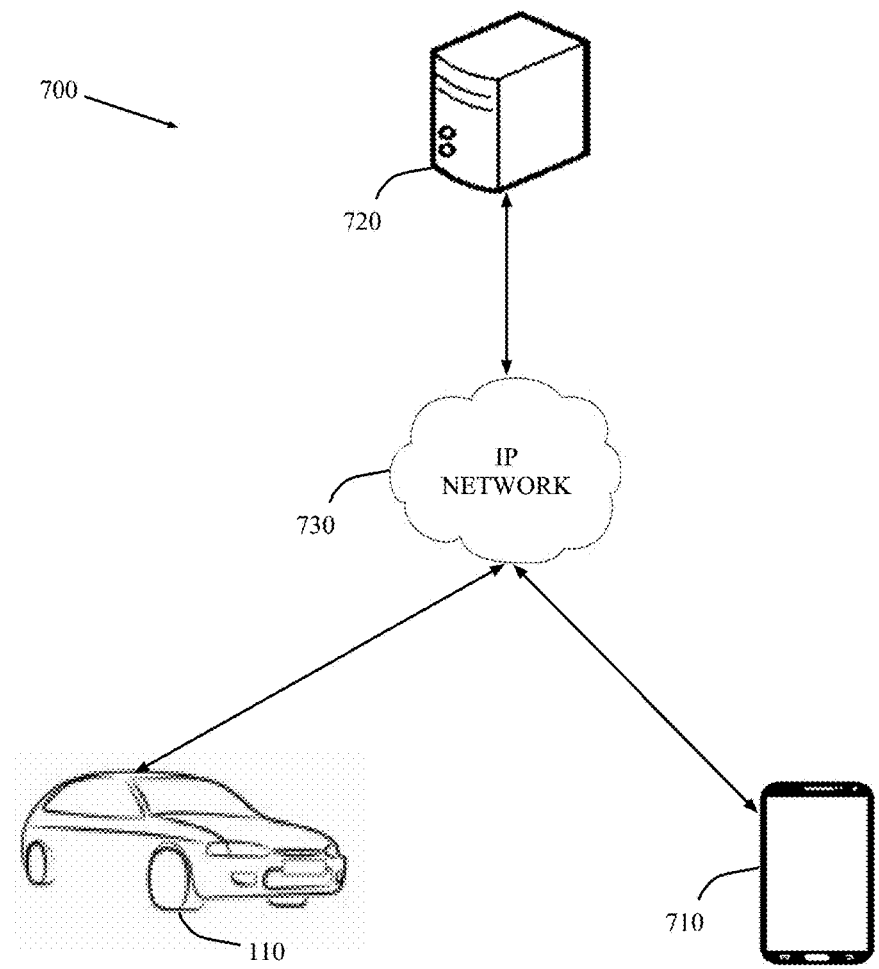
FIG. 7 illustrates an exemplary network topography for providing in-vehicle personalized settings according to one embodiment of the disclosure.
Figure 8:
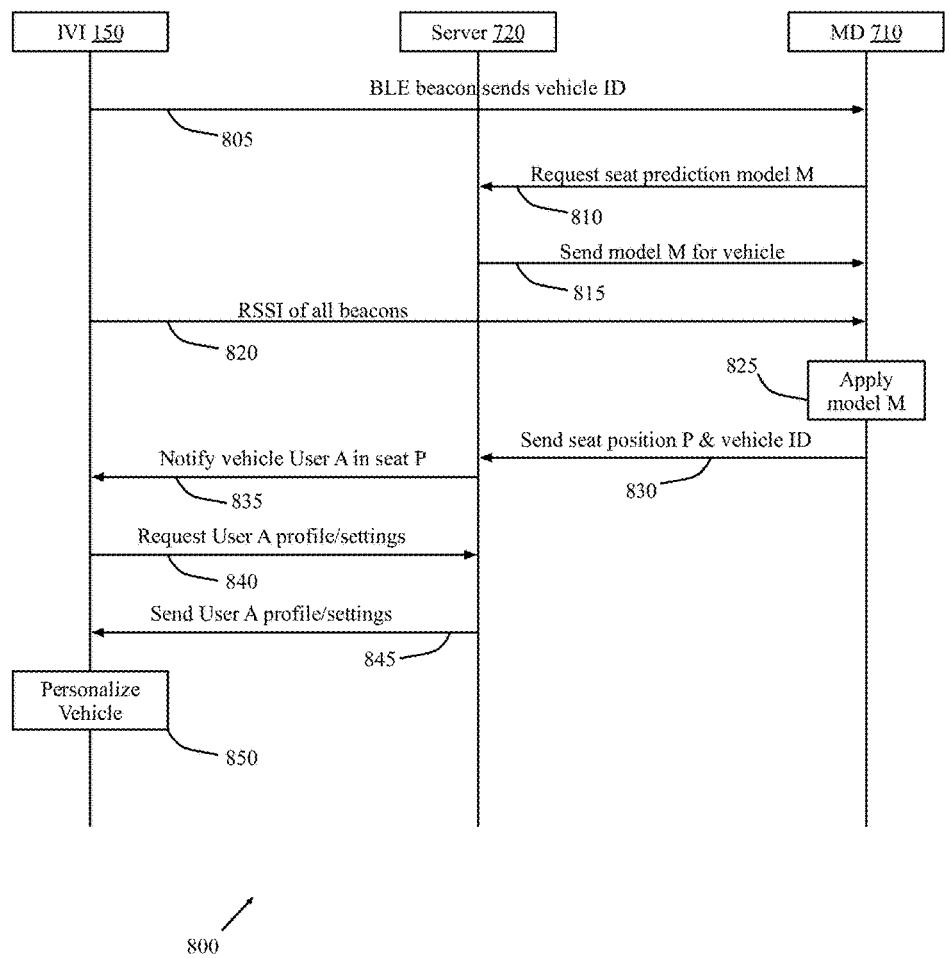
FIG. 8 is a flow diagram illustrating in-vehicle personalization according to one embodiment of the disclosure.

FIG. 7 illustrates exemplary network topography 700 for providing in-vehicle personalized settings according to one embodiment of the disclosure. FIG. 8 depicts flow diagram 800, which illustrates in-vehicle personalization according to one embodiment of the disclosure. Cloud server 720 may be accessed by and communicate with IVI system 150 in vehicle 110 and mobile device 710 associated with a user or passenger in vehicle 710. Server 720 communicates wirelessly with IVI system 150 and mobile device 710 via an Internet protocol (IP) network 730, such as the Internet. Once the seat prediction model M for vehicle 110 is determined by the owner or manufacturer, the seat prediction model M is uploaded and stored in a cloud server 720 in a record associated with the vehicle ID of vehicle 110 and downloaded when requested by any registered user. The downloaded model M can be cached in mobile device 710 for repeated use in the near future. The disclosed system enables new passengers and rental car users to receive on-demand personalized services even if the registered user and mobile device have no prior knowledge about vehicle 110.

In FIG. 8, BLE beacons BLEB1-BLEB8 associated with IVI system 150 in vehicle 110 periodically broadcast BLE beacon signals with beacon IDs to user mobile device (MD) 710 (step 805). MD 710 can then retrieve the vehicle 110 ID from the cloud server using the beacon IDs. Alternatively, the BLE beacon signal can be configured to broadcast the vehicle 110 ID directly to MD 710. When MD 710 obtains the vehicle 110 ID, MD 710 transmits to server 720 a request for the seat prediction model M for vehicle 110 (step 810). In response, server 720 retrieves the previously stored seat prediction model M for vehicle 110 and transmits model M to MD 710 (step 815). Thereafter, MD 710 measures the RSSI values of the eight BLE beacon signals transmitted by BLEB1-BLEB8 (step 820). After MD 710 determines the RSSI values, MD 710 applies the seat prediction model M to the measured RSSI values in a sliding window to predict the seat position P of the user operating MD 710 (step 825).

Next, MD 710 transmits to server 720 the predicted seat position P and the ID of vehicle 110 (step 830). In response, server 720 notifies IVI 150 in vehicle 110 that User A (operator of MD 710) is located in seat P of vehicle 110 (step 835). IVI 150 then requests User A profile and settings information (e.g., music lists, websites, videos, and the like) from server 720 (step 840). Server 720 then downloads to IVI system 150 the requested User A profile and settings information (step 845). Finally, IVI system 150 personalizes vehicle 110 according to the downloaded User A profile and settings (step 850).

The preceding FIGS. 1-8 describe apparatuses and methods for identifying and determining the seat position of each occupant of the vehicle. Once this information is known, cloud server 720 may further interact with mobile device 710 and similar mobile devices to perform mobile payment operations as described below.

Figure 9:
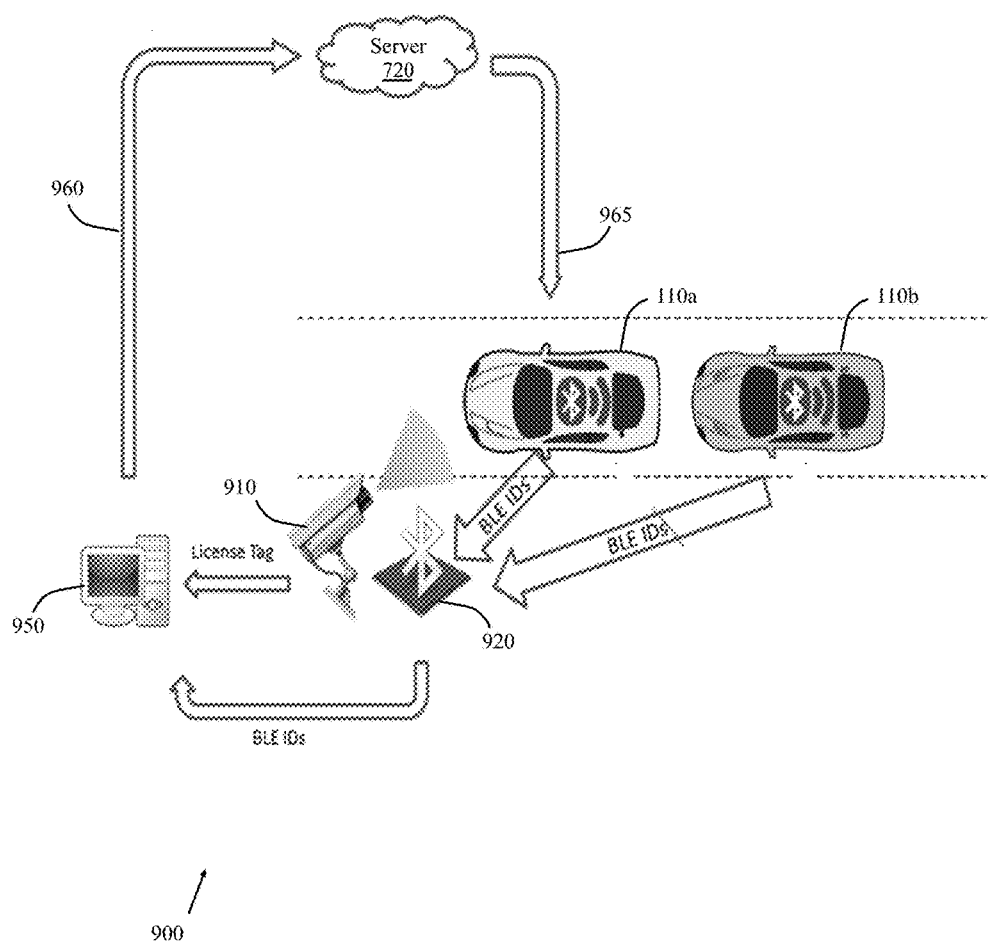
FIG. 9 illustrates the collection of vehicle identification information at a payment station according to an embodiment of the disclosure.

FIG. 9 illustrates the collection of vehicle identification information at vehicle payment station 950 according to an embodiment of the disclosure. As vehicle 110a and vehicle 110b drive through a toll plaza, camera 910 records the license tag of each vehicle and reports the license tag information (e.g., number, state) to vehicle payment station 950. Similarly, the beacon ID (BLE ID) of one or more of the plurality of Bluetooth Low Energy (BLE) beacons (BLEB1-BLEB8) in vehicles 110a and 110b are recorded by Bluetooth reader 920. The BLD IDs are also reported to vehicle payment station 950.

Vehicle payment station 950 uses the license tag and/or the BLE IDs to identify each vehicle 110 as the payer. Since the license tag can be easily stolen or replicated, the BLE beacons provide additional security beyond the license since the BLE IDs are not easily copied or spoofed. Vehicle payment station 950 transmits payment request 960 to server 720. Payment request 960 includes the amount of the payment and the recorded license tag and/or BLE IDs of each vehicle 110. Even if vehicle payment station 950 reads BLE IDs from multiple nearby vehicles, cloud server 720 maintains a database of BLE IDs for each vehicle ID and/or license tag and can validate (match) the correct BLE IDs for the captured license tag of each vehicle 110. If no match is found, then server 720 rejects payment request 960 for being invalid. This enhancement increases security. If a match is found, server 720 processes the payment request, locates the target vehicle (i.e., vehicle 110a) and transmits payment information 965 to IVI system 150 in vehicle 110a.

Figure 10:
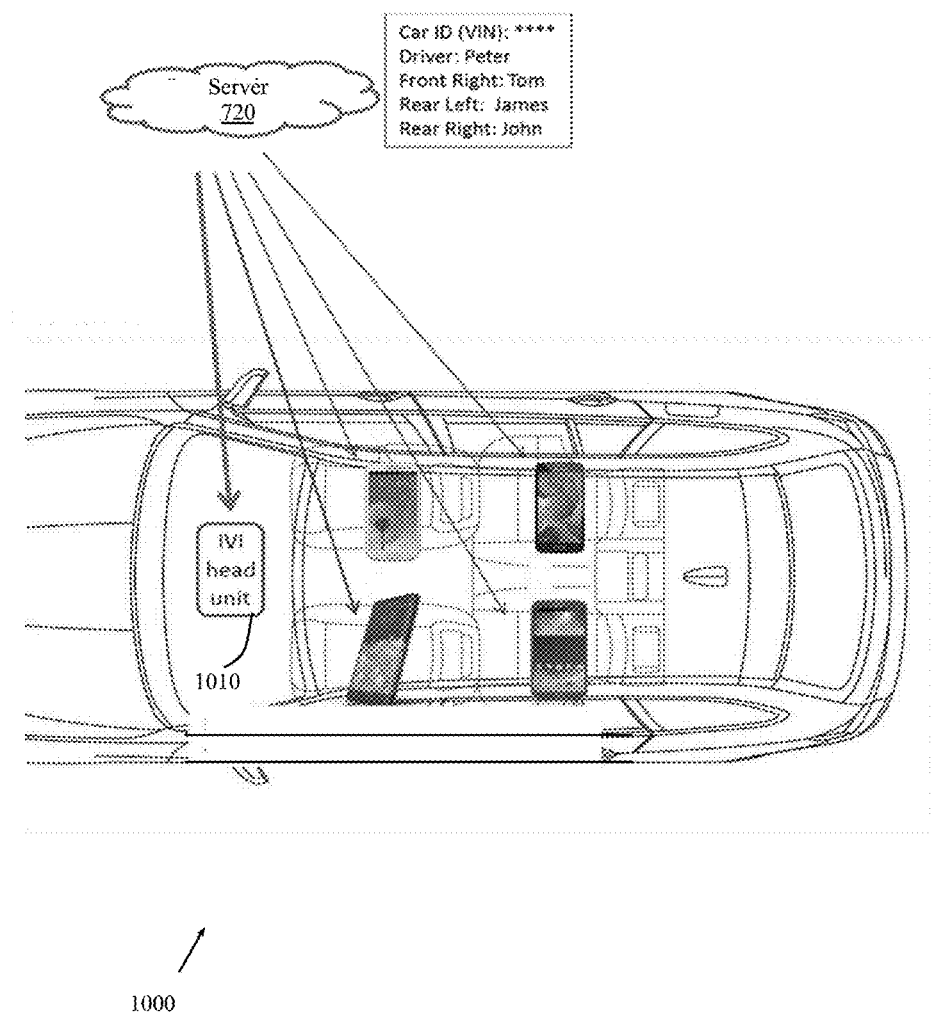
FIG. 10 illustrates the identification of multiple occupants of a vehicle by a cloud server according to an embodiment of the disclosure.

FIG. 10 illustrates the identification of multiple occupants in vehicle 110 by cloud server 720 according to an embodiment of the disclosure. As described above, with each user (i.e., vehicle occupant) registered at cloud server 720 and with a smartphone app running on each smartphone, every time the users enter vehicle 110, the IVI system 150, server 720 and the smartphone application perform the following: i) detect the seat position of each user (e.g., driver seat, front passenger, back left, or back right seat). The BLE beacons are used to achieve this; and ii) link the personal account of the driver from his smartphone with IVI head unit 1010 of vehicle 110 via cloud serve 720. The personal account is what each user registered for the connected car platform.

The IVI system 150 and cloud server 720 support multiple occupants in the same car through their personal smartphone. As a result, IVI system 150 and server 720 maintain a list of current occupants in vehicle 110. This enables payment sharing without any cumbersome configuration for each trip. When payment request 960 is initiated, such as from a drive-through restaurant or a tollbooth, payment station 950 may use the vehicle ID (e.g., VIN, license tag number) as the payer ID and sends payment request 960 to cloud server 720. Cloud server 720 forwards payment request 960 to vehicle 110 and the driver. Since cloud server 720 has already associated the driver account with IVI system 150 and IVI head unit 1010, the driver may choose to pay using IVI head unit 1010 or send a sharing payment request 960 to all occupants in vehicle 110.

Figure 11:
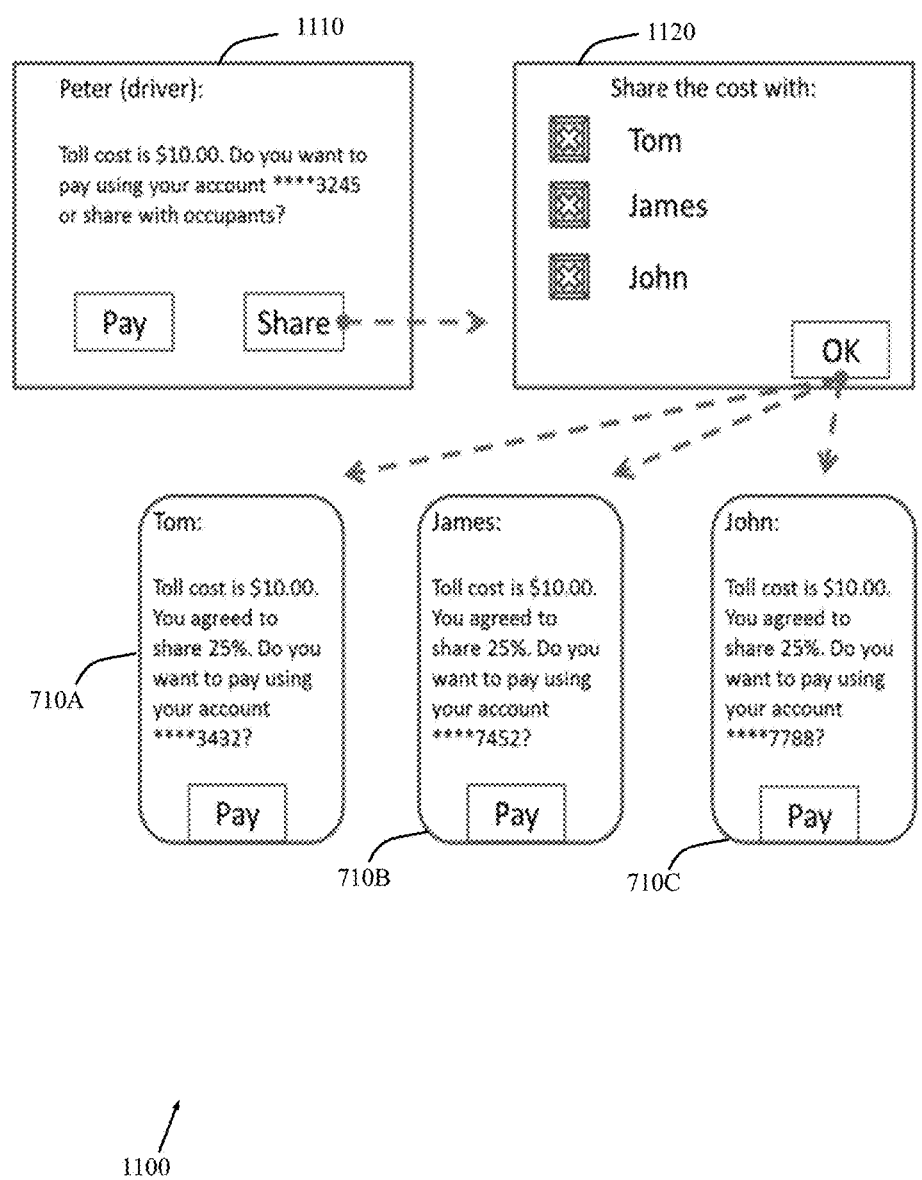
FIG. 11 illustrates the sharing of a toll charge by multiple occupants of a vehicle according to an embodiment of the disclosure.

FIG. 11 illustrates the sharing of a toll charge by multiple occupants of vehicle 110 according to an embodiment of the disclosure. The driver may pay all the cost or share the cost with all the current occupants in vehicle 110. For a single item payment, such as toll cost, the cost may be equally divided for all occupants. Optionally, the occupants may adjust the percentage or set a dollar amount. Then the actual transaction may be processed by the connected car application or through a third party payment application.

In FIG. 11, IVI head unit 1010 displays screen 1110, which includes a billing message that informs the driver (Peter) that the toll cost is $10 and offers the option to share the tollcost. The driver can then press one of two buttons on screen 1110: 1) "Pay", or 2) "Share". If the driver selects "Share", IVI system 150 relays the response to cloud server 720, which updates IVI head unit 1010 to display screen 1120, which allows the driver to pick one or more of the other occupants (Tom, James, John) with whom to share the cost of the toll. Assuming the driver selects all of the occupants and presses "OK", IVI system 150 relays this information to cloud server 720. Cloud server 720 then transmits to mobile devices 710A, 710B, and 710C (i.e., smartphones) of the other occupants messages that allow the other occupants to agree to share 25% of the toll cost. Cloud server 720 then deducts a shared portion of the toll from the account of each vehicle occupant.

Figure 12:
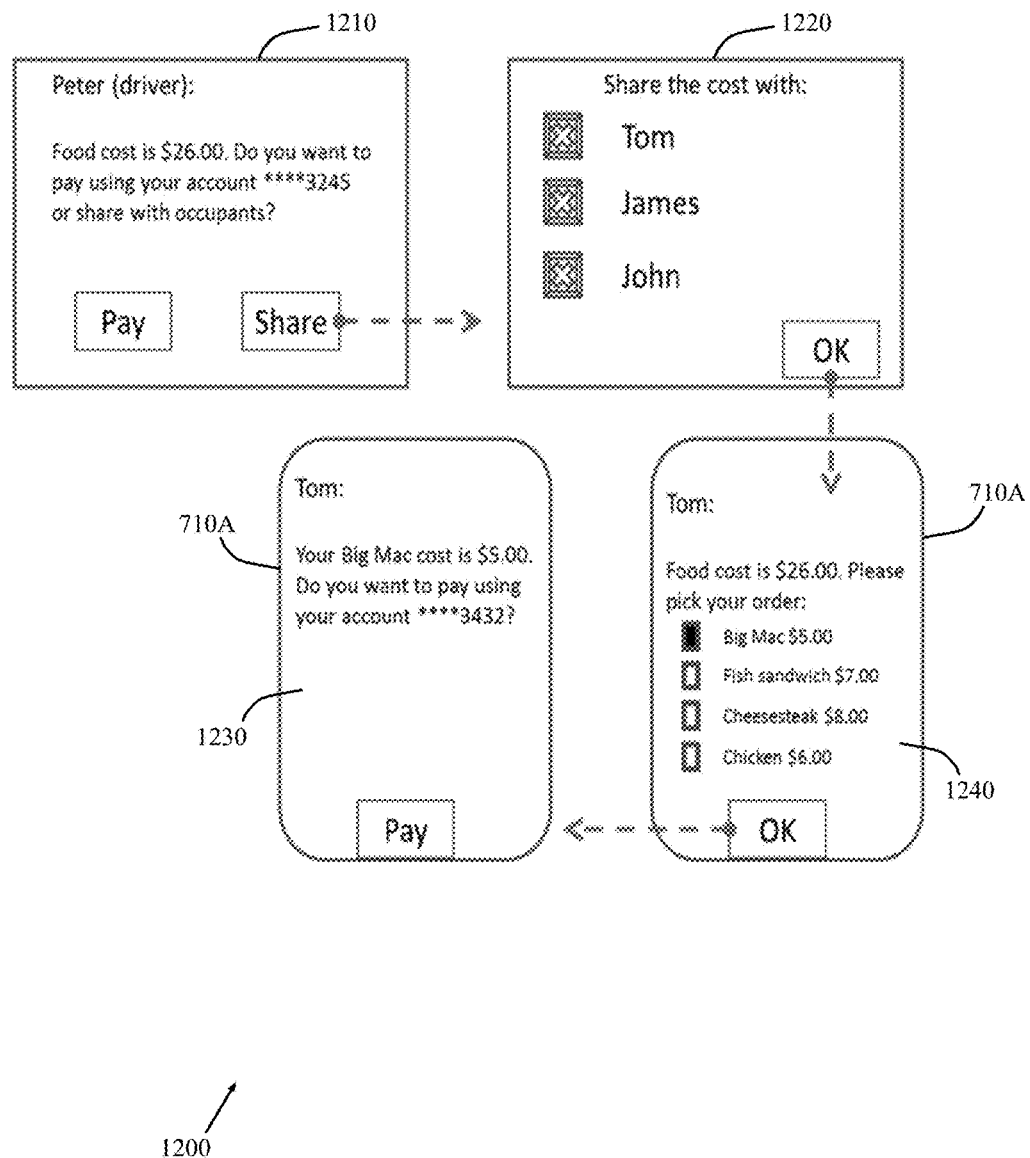
FIG. 12 illustrates the sharing of restaurant bill by multiple occupants of a vehicle according to an embodiment of the disclosure.

FIG. 12 illustrates the sharing of restaurant bill by multiple occupants of vehicle 110 according to an embodiment of the disclosure. In FIG. 12, IVI head unit 1010 displays screen 1210, which includes a billing message that informs driver (Peter) that the food cost is $26 and offers the option to share the restaurant bill. The driver presses one of two buttons on screen 1210: 1) "Pay", or 2) "Share". If the driver selects "Share", IVI system 150 relays the response to cloud server 720, which updates IVI head unit 1010 to display screen 1220, which allows the driver to pick one or more of the other occupants (Tom, James, John) with whom to share the food cost. Assuming the driver selects all of the occupants and presses "OK", IVI system 150 relays this information to cloud server 720. Cloud server 720 then transmits to mobile devices 710A, 710B, and 710C (i.e., smartphones) a message that allows each of the other occupants to select which meal is his or her meal.

By way of example, cloud server 720 sends message 1240 to mobile device 710A (used by Tom) and asks the occupant/user (Tom) to select which meal is his meal. After Tom selects his meal (e.g., Big Mac) and presses OK, mobile device 710A sends this information to cloud server 720, which responds by sending message 1230 to mobile device 710A. Message 1230 allows occupant Tom to agree to pay for his meal (press "Pay"). Cloud server 720 then deducts the cost of the meal from the account associated with vehicle occupant Tom.

It will be appreciated that various embodiments of the present disclosure as described in the specification may be realized in the form of hardware, software or a combination of hardware and software. The software may be stored in a non-transitory computer readable storage medium configured to store one or more application programs (software modules). The application programs comprise computer-executable instructions that cause a processor in an electronic device to perform a method of the present disclosure. Accordingly, exemplary embodiments provide a program comprising code for implementing an apparatus or a method as described and claimed herein and a non-transitory machine-readable storage storing such a program. Alternatively, the functionality herein may be implemented by as an Integrated Circuit (ID) or any combination of one or more processors and ICs.

The computer-executable instructions may be stored in the form of volatile or non-volatile storage such as, for example, a storage device like a read-only memory (ROM), random access memory (RAM), memory chips, device or integrated circuits or on an optically or magnetically readable medium such as, for example, a compact disk (CD), digital versatile disk (DVD), magnetic disk, magnetic tape, or the like. It will be appreciated that the storage devices and storage media are various embodiments of non-transitory machine-readable storage that are suitable for storing a program or programs comprising instructions that, when executed, implement various embodiments of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A payment server configured to share payments among occupants of a vehicle, wherein the payment server is configured to:
   receive, from a respective mobile device associated with a corresponding occupant, an identification and seat position of each occupant of the vehicle, wherein the identification and the seat position of each occupant are computed by the respective mobile device associated with the corresponding occupant;
   receive, from a payment station, a payment request comprising a payment amount and a vehicle identification;
   access, in a database associated with the payment server, a record associated with the vehicle identification, wherein the record includes the identification and the seat position of each occupant of the vehicle; and
   transmit, to an in-vehicle infotainment (IVI) system in the vehicle a first billing message associated with the payment request, the first billing message configured to be displayed on a screen of an IVI head unit in the vehicle.

2. The payment server as set forth in claim 1, wherein the payment server is further configured to identify, from the record, a driver of the vehicle, and
   wherein the first billing message provides the driver of the vehicle an option to share the payment amount with a second occupant of the vehicle.

3. The payment server as set forth in claim 2, wherein when the driver decides to share the payment amount with the second occupant of the vehicle, the payment server is further configured to transmit a second billing message to a mobile device associated with the second occupant.

4. The payment server as set forth in claim 3, wherein the second billing message is configured to enable the second occupant of the vehicle to agree to pay a portion of the payment amount.

5. The payment server as set forth in claim 3, wherein the second billing message is configured to enable the second occupant of the vehicle to select a purchased item for which the second occupant is financially responsible.

6. The payment server as set forth in claim 1, wherein the vehicle identification comprises a license plate number of the vehicle.

7. The payment server as set forth in claim 6, wherein the vehicle identification further comprises an identifier of at least one radio-frequency (RF) beacon in the vehicle.

8. The payment server as set forth in claim 7, wherein the at least one RF beacon comprises a Bluetooth Low Energy beacon.

9. A method of sharing payments among occupants of a vehicle, wherein one or more mobile devices are associated with corresponding ones of a number of occupants of the vehicle, the method comprising:
   receiving, from a respective mobile device associated with a corresponding occupant, an identification and seat position of each occupant of the vehicle, wherein the identification and the seat position of each occupant are computed by the respective mobile device associated with the corresponding occupant;
   receiving, by a payment server from a payment station, a payment request comprising a payment amount and a vehicle identification;
   accessing a record associated with the vehicle identification, wherein the record is located in a database associated with the payment server and includes an identification and seat position for each of the number of occupants of the vehicle; and
   transmitting, to an in-vehicle infotainment (IVI) system in the vehicle, a first billing message associated with the payment request, the first billing message configured to be displayed on a screen of an IVI head unit in the vehicle.

10. The method as set forth in claim 9, further comprising:
    identifying, from the record, a driver of the vehicle,
    wherein the first billing message provides the driver of the vehicle an option to share the payment amount with a second occupant of the vehicle.

11. The method as set forth in claim 10, further comprising:
    when the driver decides to share the payment amount with the second occupant of the vehicle, transmitting a second billing message to a mobile device associated with the second occupant.

12. The method as set forth in claim 11, wherein the second billing message is configured to enable the second occupant of the vehicle to agree to pay a portion of the payment amount.

13. The method as set forth in claim 11, wherein the second billing message is configured to enable the second occupant of the vehicle to select a purchased item for which the second occupant is financially responsible.

14. The method as set forth in claim 9, wherein the vehicle identification comprises a license plate number of the vehicle.

15. The method as set forth in claim 14, wherein the vehicle identification further comprises an identifier of at least one radio-frequency (RF) beacon in the vehicle.

16. The method as set forth in claim 15, wherein the at least one RF beacon comprises a Bluetooth Low Energy beacon.

17. A non-transitory computer readable medium comprising a plurality of instructions that, when executed by a processor, is configured to cause the processor to:
receive, from a respective mobile device associated with a corresponding occupant, an identification and seat position of each occupant of a vehicle, wherein the identification and the seat position of each occupant are computed by the respective mobile device associated with the corresponding occupant;
receive, from a payment station, a payment request comprising a payment amount and a vehicle identification;
access, in a database associated with a payment server, a record associated with the vehicle identification, wherein the record includes an identification and seat position of each occupant of the vehicle; and
transmit, to an in-vehicle infotainment (IVI) system in the vehicle, a first billing message associated with the payment request, the first billing message configured to be displayed on a screen of an IVI head unit in the vehicle.

18. The non-transitory computer readable medium as set forth in claim 17, further comprising instructions that, when executed by the processor, is configured to cause the processor to:
identify, from the record, a driver of the vehicle,
wherein the first billing message provides the driver of the vehicle an option to share the payment amount with a second occupant of the vehicle.

19. The non-transitory computer readable medium as set claim 18, further comprising:
when the driver decides to share the payment amount with the second occupant of the vehicle, transmitting a second billing message to a mobile device associated with the second occupant.

20. The non-transitory computer readable medium as set forth in claim 19, wherein the second billing message provides an option to the second occupant of the vehicle to agree to pay a portion of the payment amount.

* * * * *